United States Patent [19]

Russo et al.

[11] Patent Number: 4,678,268
[45] Date of Patent: Jul. 7, 1987

[54] METHOD AND APPARATUS FOR CONSTRUCTING MICROLENS ENDS FOR OPTICAL FIBERS

[75] Inventors: Vera Russo; Stefano Sottini; Giancarlo Righini; Silvana Trigari, all of Florence, Italy

[73] Assignee: Consiglio Nazionale Delle Ricerche Roma, Rome, Italy

[21] Appl. No.: 663,547

[22] Filed: Oct. 22, 1984

[30] Foreign Application Priority Data

Oct. 25, 1983 [IT] Italy .................................. 9545 A/83

[51] Int. Cl.$^4$ ................................................ G02B 6/32
[52] U.S. Cl. ............................ 350/96.18; 219/121 LF; 350/320; 350/417
[58] Field of Search ............... 350/96.18, 96.29, 96.30, 350/96.15, 320, 416, 417; 219/121 LF, 121 LM

[56] References Cited

U.S. PATENT DOCUMENTS 4,147,402 4/1979 Chown ............................. 350/96.18
4,383,731 5/1983 Simon et al. ..................... 350/96.18

OTHER PUBLICATIONS

Paek, U. C. and Weaver, A. L. "Formation of a Spherical Lens at Optical Fiber Ends with a $CO_2$ Laser," *Applied Optics*, vol. 14, No. 2 (2–1975), pp. 294–298.

*Primary Examiner*—John Lee
*Attorney, Agent, or Firm*—Charles W. Fallow; Martin P. Hoffman; Mitchell B. Wasson

[57] ABSTRACT

The method for constructing microlens ends for optical fibres, particularly for biomedical and/or surgical use, is characterised by propagating in the optical fibre a radiation of the type used during the application of the fibre itself, and to which said fibre is transparent, and converting the wavelength of the radiation, outside to the fibre and in proximity to its output end, which has been previously cut along a plane orthogonal to its axis, into a band of wavelengths which can be absorbed by the fibre, for a time sufficient to cause localised fusion of the end. In order to implement this method, the invention also provides for the use of a device comprising a block of material which converts radiation and is provided with a flat surface, a support which keeps the fibre orthogonal to said flat surface and with its previously cut end facing said flat surface, and means for varying in a controlled manner, preferably by micrometric regulation, the distance between the fibre end and the said flat surface of the block of material.

12 Claims, 7 Drawing Figures

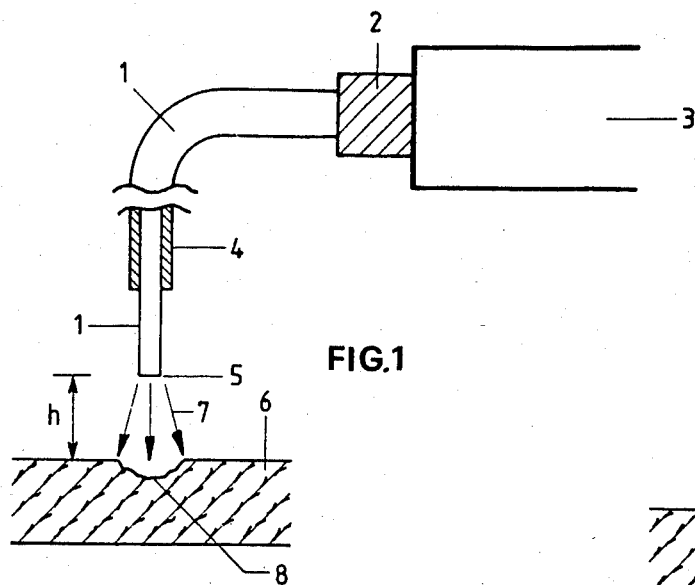
FIG.1
FIG.2
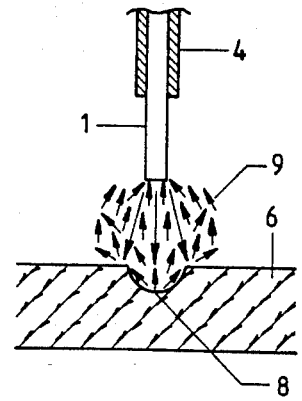
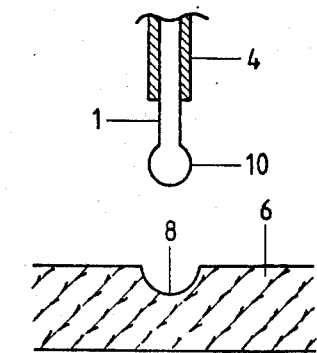
FIG.3
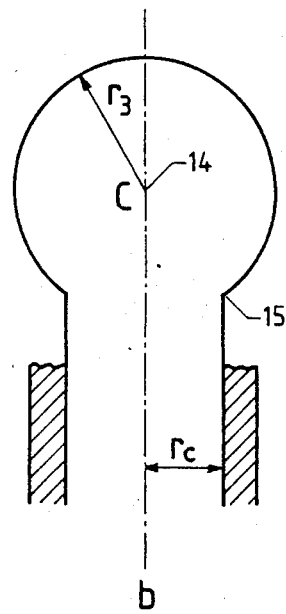
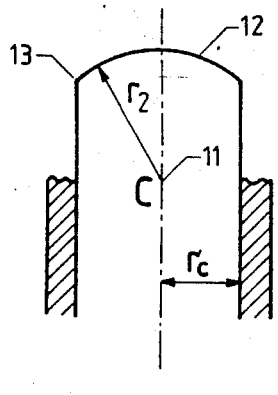
FIG.4
FIG.5

METHOD AND APPARATUS FOR CONSTRUCTING MICROLENS ENDS FOR OPTICAL FIBERS

BACKGROUND OF THE INVENTION

This invention relates to a method for constructing microlens ends for optical fibres, particularly for biomedical and/or surgical use, by using the laser light transmitted by the fibre itself in order to generate a microcrater in a suitable material (for example clay containing a certain percentage of iron oxide) and consequently to locally attain the required temperature for melting said end.

Fibres with microlens end were initially introduced for optical communication applications, for the purpose of improving the efficiency of coupling either to the source (for example a semiconductor laser) or to a second fibre. Subsequently, with the rapid development of laser applications in biomedicine and surgery, optical fibres were widely used for conveying radiation from the source to the target, and thus also allowing endoscopic applications. Often, for example for surgical applications, high powers have to be transmitted by coupling a single optical fibre to an argon laser (5-30 W) or to a Nd-YAG laser (50-100 W). In this type of application, microlens ends have proved advantageous compared with the usual flat ends both in focusing the light energy while preventing contact between the fibre and tissue, and thus reducing the risk of contaminating and damaging the fibre termination, and in utilising the increased divergence of the output light beam to obtain rapid reduction in the power density beyond the focal point and thus reduce the risk of damaging internal tissues.

For example, some tests have been carried out in experimental neurosurgery (Sottini M, et al. in Interdisciplinary Trends in Surgery, vol. 11, pp. 989-992, 1979, Minerva Medica).

Microlens ends are also used in laser endoscopy because the considerable divergence of the output beam allows sufficiently uniform treatment over relatively large areas and in some cases also allows vaporisation of large tumoral masses.

Whereas communication applications involve small-diameter monomode or multimode graded index fibres (for example with a 4-60 $\mu$m core), in the case of medical applications step-index fibres with a quartz core and relatively large diameter (200-600 $\mu$m) are used.

The methods for constructing microlens ends proposed up to the present time are generally directed towards the first type of application. Some interesting methods, for example, are based on selective etching. However, large core diamater fibers require a relatively long etching time. It makes this technique unattractive for the considered application, especially in view of fabricating the fiber end in the surgery theater in real time.

Another class of fabrication process makes use of thin-film deposition techniques of photoresists or other organic materials. Sometimes the deposition is followed by photoshaping of the film. These materials, however, are not convenient for high-power laser applications due to possible damaging of the microlens. Even with low- or medium-power lasers, problems in medical applications can arise from the use of materials which are not completely safe if contact of the fiber tip with biological tissue occurs; this has to be borne in mind in endoscopic surgery or in photoradiation therapy of cancer following hematoporphyrin sensitization.

A method has also been proposed which enables a microlens of high index glass to be deposited on the flat fibre end, this being obtained by melting a droplet of the required glass into a spiral filament. However, again the relatively low melting point seems to make the microlens subject to damage. Moreover, construction of the fibre end requires a relatively complicated device.

Finally, a third class of fabrication method is based on heating the fibre end to its melting point. The fibre tip then assumes the required microlens shape by the effect of surface tension. In particular, in the case of graded index fibres of glass or fused quartz, various methods have been used for heating and melting the end. Firstly, Kato (Kato D, in J. Appl. Phys., vol. 44, p. 294, 1973) used a hydrogen-oxygen torch, and then Paek and Weaver (Paek U.C. et al., in Appl. Opt., vol. 14, p. 294, 1975) used a $CO_2$ laser, and finally Benson et al. (Benson W.W. et al., in Appl. Opt., vol. 14, p. 2815, 1975) used a natural gas microtorch.

From the data published in the literature, it appears that all these methods allowed the construction of microlenses on fibres having a core diameter of between 40 and 150 $\mu$m. Analogous results are probably obtained using arc discharges. This method has been tested experimentally in the case of a Corning graded index fibre with a 60 $\mu$m diameter core. Tungsten needle electrodes were used at a distance of 1 mm. The power was 10 W for 4 sec.

It should be noted that all these methods require the use of heat sources external to the fibre. In some cases, said sources are also rather costly (for example $CO_2$ lasers) and/or require the use of fairly complicated complementary devices.

In conclusion, none of the aforesaid methods seems to be entirely satisfactory for manufacturing microlenses for biomedical or surgical use. In particular, those methods using heating, which are relatively the most convenient, require the use of a source external to the fibre, as stated. Again, of these methods, the cheapest and least cumbersome techniques, like that of using a microtorch, may have their own disadvantages: heating is generally not uniform and as a consequence the microlens symmetry strongly depends on the operator's skill, especially for large-diameter fibres, (in this respect it should be noted that the experiments described in the literature are limited to fibres having a diamater of less than 150-200 $\mu$m, whereas fibres for medical use have a core diameter of between 200 and 600 $\mu$m). All this makes it difficult to immediately reconstruct, for example in the operating theatre, a microlens end which has become damaged during biomedical or surgical treatment. On the other hand, because of the high risk of this damage, such a requirement would seem to be particularly felt by potential users.

SUMMARY OF THE INVENTION

According to the invention, the aforesaid drawbacks and limitations are obviated by a method for constructing microlens ends for optical fibres, particularly for biomedical and/or surgical use, characterised by propagating in the optical fibre a radiation of the type used during the application of the fibre itself, and to which said fibre is transparent, and converting the wavelength of said radiation, outside to the fibre and in proximity to its output end, which has been previously cut along a plane orthogonal to its axis, into a band of wavelengths which can be absorbed by said fibre, for a time sufficient to cause localised fusion of said end.

Advantageously, the fibre end can be placed facing a material, preferably containing iron oxide which absorbs the radiation transmitted by said fibre and reflects the converted radiation towards said end.

Again according to the invention, the fibre end can be placed facing a material in which a microcrater forms due to absorption of the radiation transmitted by the fibre, and reflects the converted radiation towards the fibre end.

In order to implement the aforesaid method, the invention also provides for the use of a device comprising a block of material which converts radiation and is provided with a flat surface, a support which keeps the fibre orthogonal to said flat surface and with its previously cut end facing said flat surface, and means for varying in a controlled manner, preferably by micrometric regulation, the distance between the fibre end and the said flat surface of the block of material.

BRIEF DESCRIPTION OF THE DRAWINGS

The present invention will be better clarified with reference to the following drawings in which:

FIG. 1 diagrammatically shows the surface of a suitable material facing the flat end of the optical fibre, and the formation of a microcrater in said material by the effect of the absorption of the radiation from the fibre end.

FIG. 2 shows the microcrater of FIG. 1, which re-emits radiation in a wavelength band which is absorbed by the fibre end.

FIG. 3 shows the microlens formation by the effect of the melting of the fibre tip and the surface tension.

FIG. 4 diagrammatically shows the first type of microlens end, namely arc-shaped, obtainable by the method illustrated in the preceding figures.

FIG. 5 shows the second type of microlens, namely the bulb type, again obtainable by the method shown in FIGS. 1, 2 and 3.

DESCRIPTION OF THE PREFERRED EMBODIMENT

Figure 6:
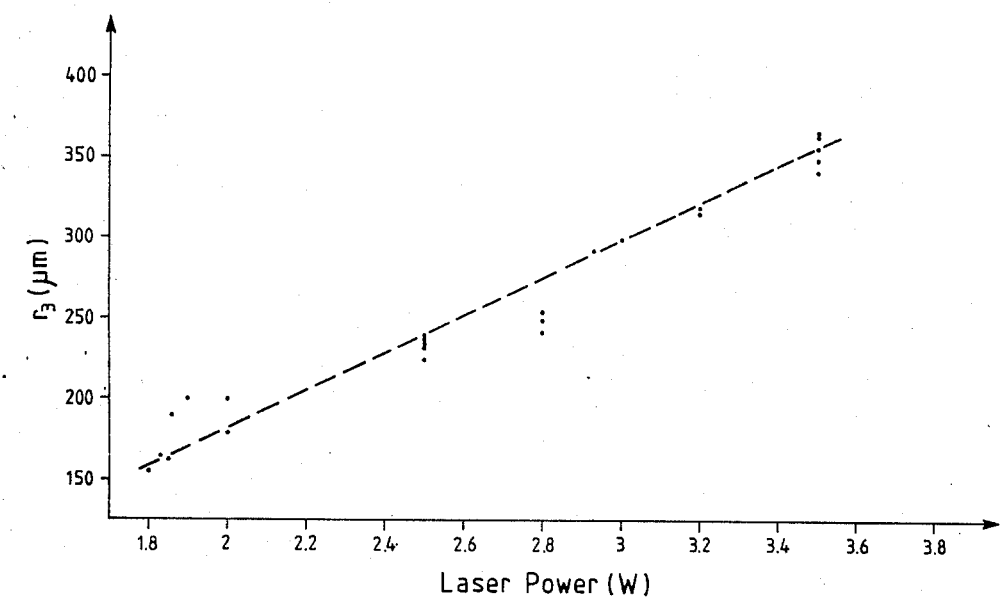
FIG. 6 shows by way of example how the radius of curvature $r_3$ of a bulb microlens depends on the power of the laser light transmitted by the fibre; the fibres used were of quartz-plastic type with a core diameter of 300 μm; the laser was of argon type, the distance H (FIG. 1) was 150 μm and the exposure time was 4 seconds.

With reference to FIG. 1, the optical fibre 1 is fed with the laser 3 by means of the coupler 2. The other end 5 of the fibre, after being perfectly cut by a comercially available fibre cutting machine and having its plastics covering 4 removed (if the fibre has a plastics cladding, this must also be removed) for a few millimetres starting from the termination, is placed at a known distance h (for example 150 μm) from the surface 6 of a suitable material (for example kaolin and iron oxide) such that the fibre axis is perpendicular to said surface 6. The laser light 7 emitted by the end 5 is absorbed by the surface 6 and causes formation of the microcrater 8. Consequently, as shown in FIG. 2, from the microcrater 8 there is re-emission of suitable radiation 9 (for example in the middle IR), which strikes the end 5 and is strongly absorbed. There is consequently strong local heating of the fibre tip which, as shown in FIG. 3, melts to give rise to the microlens 10 by the effect of the surface tension.

The microlens ends obtainable by the method shown in FIGS. 1, 2 and 3 are of two types, namely arc-shaped and bulb type, which are shown diagrammatically in FIGS. 4 and 5 respectively. An arc-shaped termination is characterised in that the dioptric surface centre 11 is within the fibre core. In practice, the dioptric surface is almost perfectly spherical, but with the corners 13 slightly unrounded, and can therefore be characterised merely by the radius $r_2$.

In contrast, as shown in FIG. 5 the bulb microlenses have their dioptric surface centre 14 within the bulb itself. Generally, the bulb surface is spherical with good precision, except in the zone 15 where it connects to the fibre. Thus these microlenses are also characterised by giving the radius of curvature $r_3$.

For a given type of fibre, chosen the laser and the material in which to form the microcrater, microlenses either of the bulb type or of the arc-shaped type can be generally obtained, and with different radii of curvature for each type, by varying the output light power, the time of application and the distance h (shown in FIG. 1). By way of example, in FIG. 6 the radii $r_3$ of bulb microlenses are plotted versus the power of the radiation from an argon laser measured at the fibre output, immediately before constructing the microlens. The data relate to a fibre with a quartz core of diameter 300 μm and to a distance h of 150 μm. The exposure time was 4 seconds.

As can be seen from the experimental data, the method seems very reliable in that the variations in the radius of the bulbs obtained lie within 10%.

Figure 7:
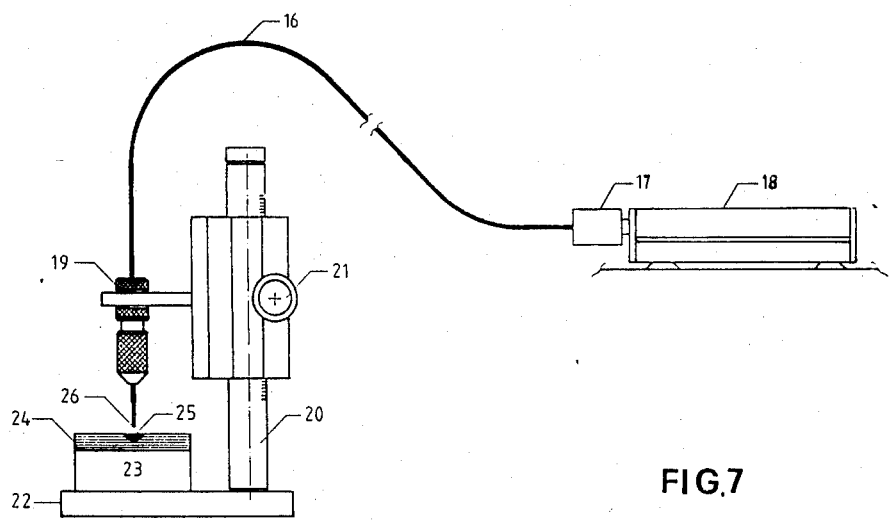
FIG. 7 diagrammatically shows a device for constructing microlenses according to the invention.

The device shown in FIG. 7 can be used advantageously for constructing microlenses according to the invention. The optical fibre 16 is fed by the laser 18 through the coupler 17. After being perfectly cut, the other end of the fibre is inserted into a chuck 19 rigid with a column 20 provided with a micrometric displacement system 21. The chuck and column must be mounted in such a manner as to ensure that the fibre is perpendicular to the baseplate 22 of the device.

The block 23, which has parallel bases, is placed on the plate 22 and has its upper portion 24 constituted by a material, for example clay containing iron oxide, which is suitable for forming the microcrater 25 which re-emits infrared radiation as required. The lower part of the block 23 can be of any material, for example magnetic, so as to secure said block to the metal baseplate 22.

The fibre termination 26 is slid through the chuck until it comes into contact with the block surface 24. The fibre is then locked in the chuck, and by operating the micrometric screw 21 the termination 26 is withdrawn from the block by a predetermined distance (eg. 150 μm).

At this point it is necessary only to open the laser shutter for a predetermined time (dependent on the laser power and type) to form the microcrater 25 and thus the microlens.

The advantages of the present invention lie both in the fact that the rotational symmetry of the microlens is ensured provided that the surface of the material (eg. kaolin and iron oxide) facing the fibre termination is normal to the fibre itself, and in the facility for constructing the microlens even during biomedical or surgical treatment, for example in the operating theatre, as there are no contamination problems and the actual laser employed for the therapy (eg. argon or Nd-YAG) can be used as the source. Finally, reproducibility of results can be obtained independently of the ability of the operator by merely controlling the distance, the laser power and the exposure times.

As the fibre is always coupled to the laser source required by the therapy, the method also allows immediate checking of the constructed microlens, for example by observing the distribution of the output light from the fibre on a simple screen (possibly able to detect infrared radiation).

We claim:

1. A method for constructing an integral microlens at an end of an optical fiber made of a material transparent to electromagnetic radiation of at least one frequency, but absorptive of other frequencies, comprising steps of
    introducing primary radiation to which said material is transparent into said fiber and along the length thereof toward and through said end,
    converting said primary radiation emitted from said fiber end to secondary radiation whose spectrum is at least partially absorbable by a said fiber material, and
    causing said secondary radiation to strike said fiber end to heat the same for a time sufficient to cause localized fusion of said end and the rounding thereof by surface tension of the material.

2. A method as claimed in claim 1, wherein said converting step comprises steps of
    placing said fiber end opposite a target capable of absorbing said primary radiation and re-emitting said secondary radiation toward said fiber end.

3. A method as claimed in claim 2, wherein said target contains iron oxide.

4. A method as claimed in claim 3, wherein the iron oxide content of the target is 5% to 30% by weight.

5. A method as claimed in claim 2, 3 or 4, wherein said primary radiation is of sufficient power to form a microcrater in said target, which microcrater thereby acts as a blackbody radiator directing secondary radiation toward said fiber end.

6. A method as claimed in claim 3, wherein the lens radius of curvature is controlled by varying the percentage of iron oxide in the target material.

7. A method as claimed in claim 1 or 2, wherein the lens radius of curvature is controlled by varying said heating time.

8. A method as claimed in claim 1 or 2, wherein the lens radius of curvature is controlled by varying the power of said primary radiation.

9. A method as claimed in claim 2, wherein the lens radius of curvature is controlled by varying the distance between the fiber end and the target.

10. An apparatus for implementing the method of claim 2, comprising
    a block of target material for converting said primary radiation to secondary radiation, said block having a flat surface,
    a support for maintaining said fiber orthogonal to said flat surface, with its end facing said flat surface, and
    means for adjustably controlling the distance between the fiber end and said flat surface.

11. An apparatus as claimed in claim 10, wherein said support comprises
    a baseplate,
    means for attaching said target block to said baseplate, and
    means attached to said baseplate for supporting said fiber; and
    wherein said controlling means includes a system for the micrometric regulation of the distance between said fiber and said target block.

12. An apparatus as claimed in claim 10, wherein said block comprises a layer of kaolin containing 5% to 30% by weight of iron oxide.

* * * * *